US009262038B2

(12) United States Patent
Sheasby et al.

(10) Patent No.: US 9,262,038 B2
(45) Date of Patent: Feb. 16, 2016

(54) METHOD AND SYSTEM FOR REFERENCED REGION MANIPULATION

(75) Inventors: Michael Chilton Sheasby, Boucherville (CA); A. Michael Mondry, Nun's Island (CA)

(73) Assignee: LumaPix, Brossard, Quebec (CA)

( * ) Notice: Subject to any disclaimer, the term of this patent is extended or adjusted under 35 U.S.C. 154(b) by 1208 days.

(21) Appl. No.: 11/870,403

(22) Filed: Oct. 10, 2007

(65) Prior Publication Data
US 2009/0100374 A1    Apr. 16, 2009

(51) Int. Cl.
*G06F 3/048*     (2013.01)
*G06F 3/0481*    (2013.01)

(52) U.S. Cl.
CPC .................... *G06F 3/0481* (2013.01)

(58) Field of Classification Search
CPC ............................ G06F 3/048; G06F 3/0481
USPC .......................... 715/788, 769, 792, 799, 800
See application file for complete search history.

(56) References Cited

U.S. PATENT DOCUMENTS

| | | | |
|---|---|---|---|
| 6,201,548 B1 * | 3/2001 | Cariffe et al. ................. | 345/620 |
| 7,194,697 B2 * | 3/2007 | Sinclair et al. ................ | 715/800 |
| 7,503,004 B2 * | 3/2009 | Sai ................................ | 715/730 |
| 2005/0104897 A1 * | 5/2005 | Walker et al. ................. | 345/620 |
| 2005/0108620 A1 * | 5/2005 | Allyn et al. ................... | 715/500 |
| 2005/0134933 A1 * | 6/2005 | Tsue et al. .................... | 358/437 |
| 2005/0152002 A1 * | 7/2005 | Shirakawa et al. .......... | 358/1.18 |
| 2006/0181518 A1 * | 8/2006 | Shen et al. .................... | 345/173 |
| 2008/0022218 A1 * | 1/2008 | Cai ............................... | 715/769 |
| 2008/0291497 A1 * | 11/2008 | Kuwano et al. .............. | 358/1.18 |

\* cited by examiner

*Primary Examiner* — Rashawn Tillery

(57) ABSTRACT

A method and computer graphics program executed by one or more processors is described for arranging regions which refer to various parts of a graphical layout such that changes to the original layout result in updates to the said regions. The regions themselves may be arranged by the user in patterns for various purposes, such as condensing graphical content spread over many parts of the original layout into a single output page in order to minimize the consumption of ink and paper when printing.

19 Claims, 7 Drawing Sheets

FIGURE 1: COMPUTER SYSTEM
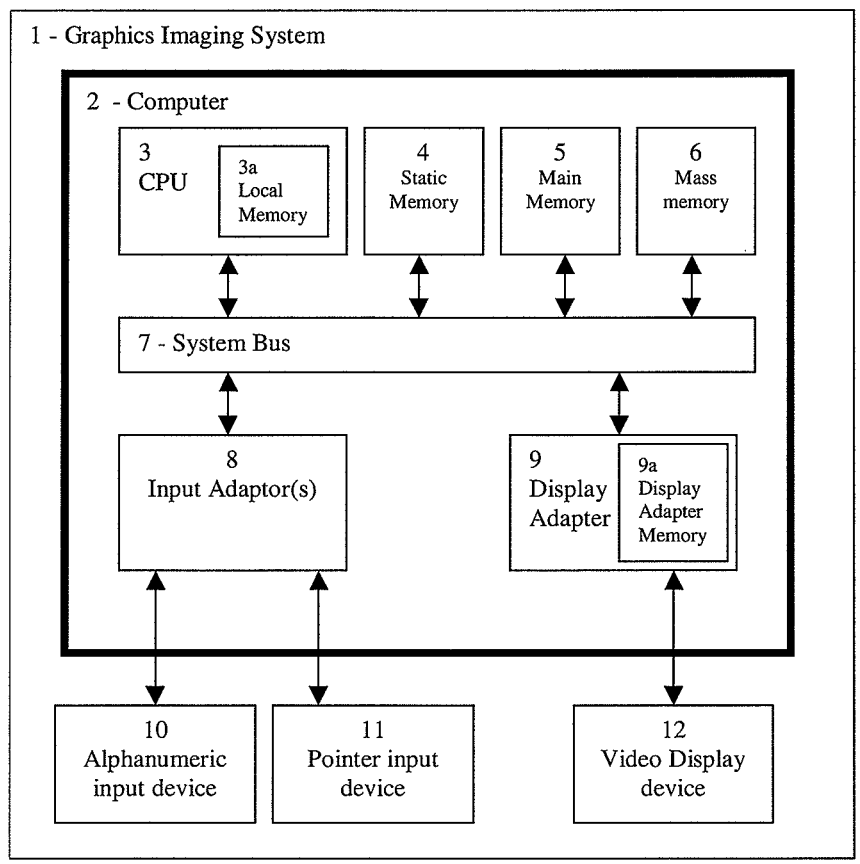

FIGURE 2: SOURCE LAYOUTS
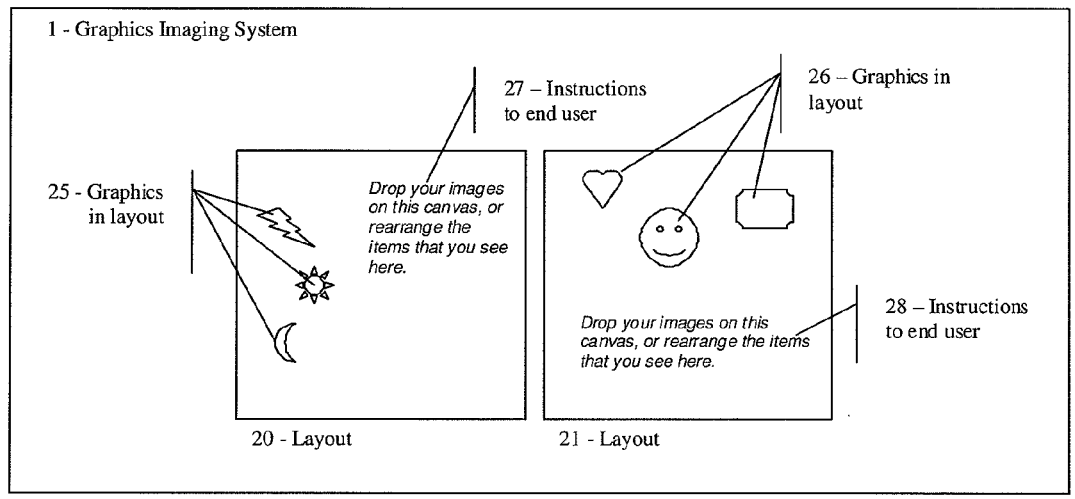
FIGURE 3: SOURCE REFERRING REGIONS
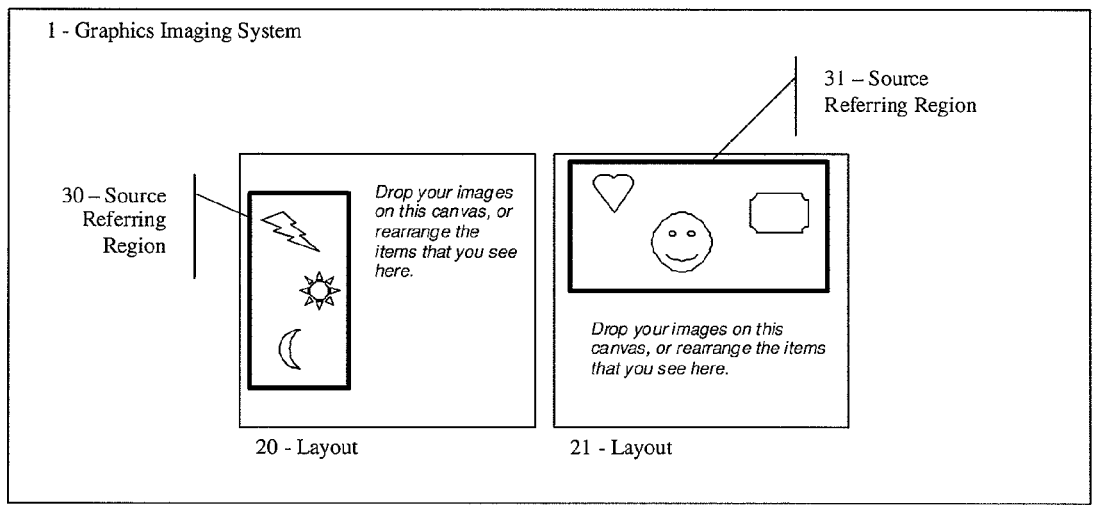

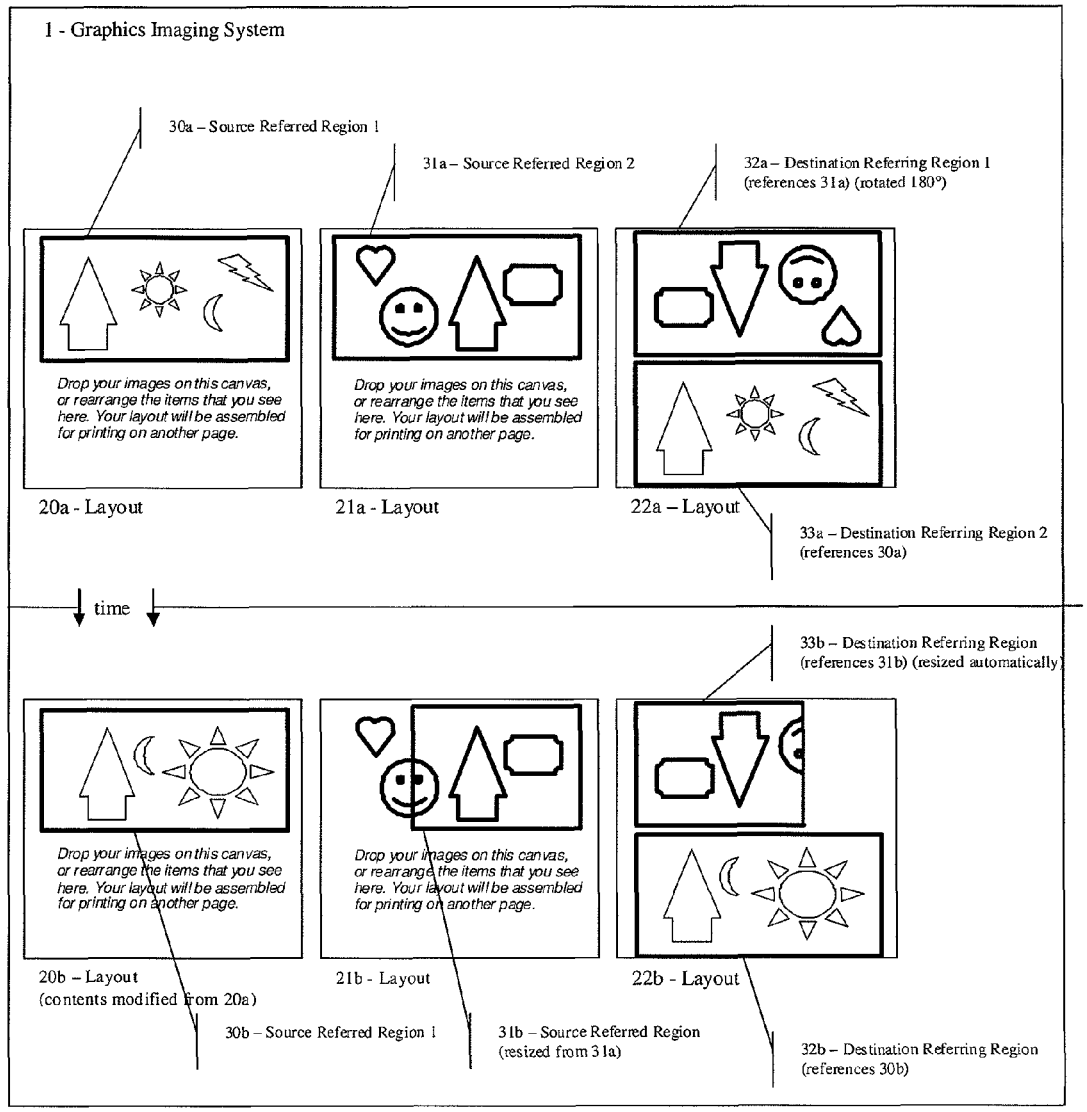

FIGURE 5: SAME-PAGE REGIONS
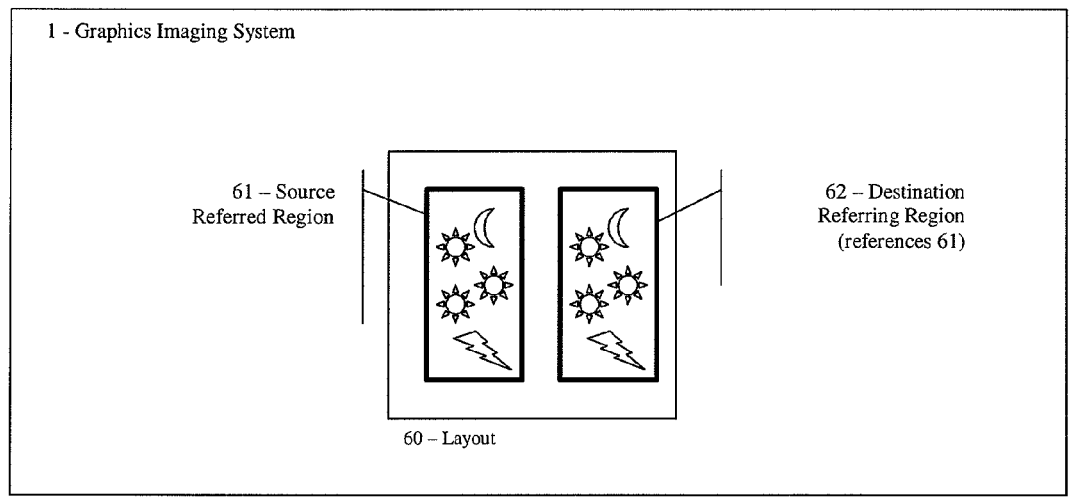

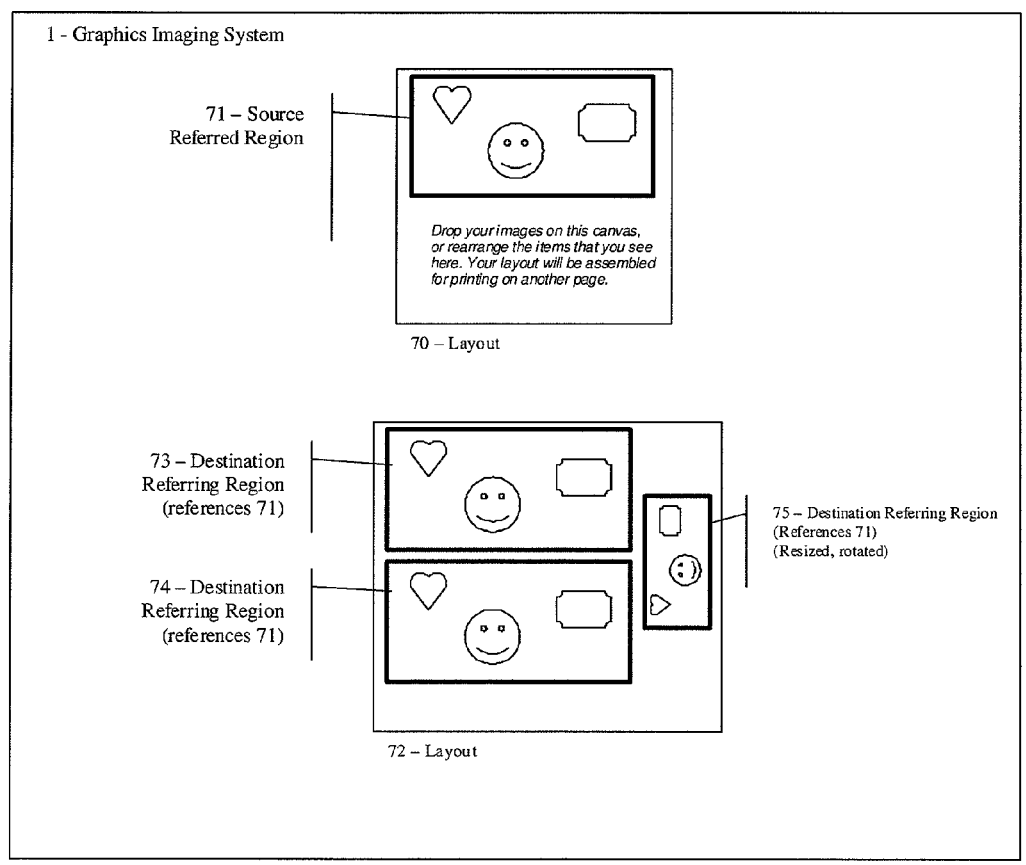

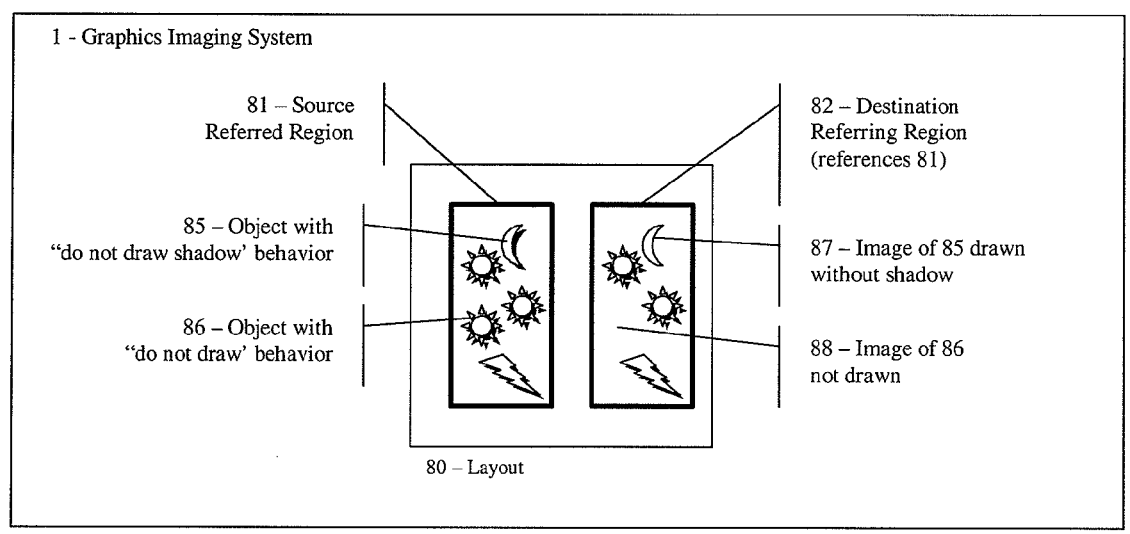

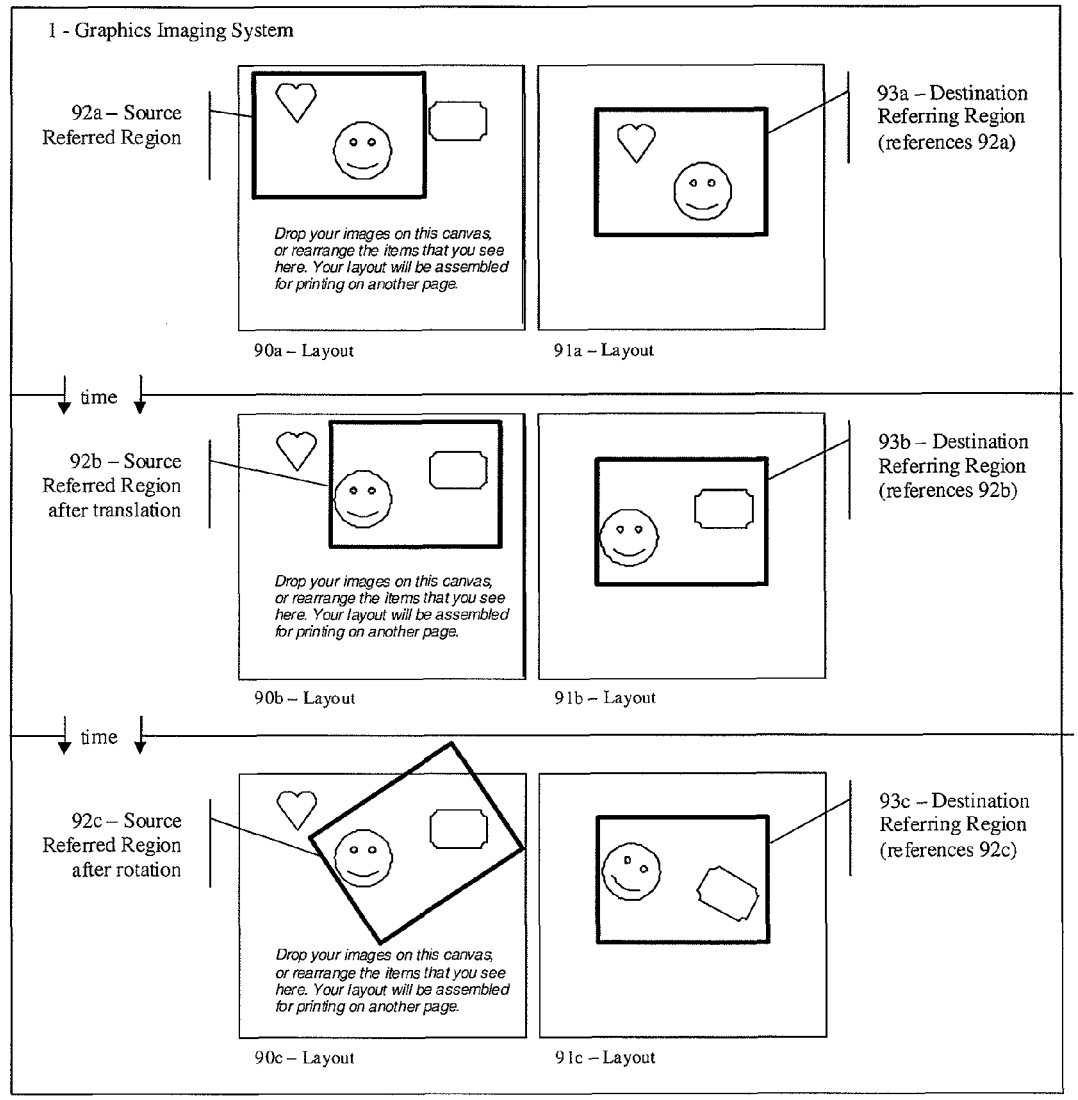
FIGURE 8: REGION MANIPULATION

METHOD AND SYSTEM FOR REFERENCED REGION MANIPULATION

CROSS REFERENCE TO RELATED APPLICATIONS

The present invention shares the same inventors and assignee as, and is related to, the following applications: entitled "METHOD AND SYSTEM FOR MULTIPAGE PRINT LAYOUT", Appl. Ser. No. 60/469,873, in that the methods of print region definition described therein may optionally be combined with the user interface elements described herein.

DESCRIPTION OF THE PRIOR ART

The popular spreadsheet program Microsoft Excel™ allows the user to define a "Print Area". This object, defined as a set of cells within a matrix of information, is used to indicate a region of interest within a larger data surface; the user can choose to print just this print area, or the entire matrix of information.

In contrast, a user of the current invention defines a region of interest (a Source or Referred Region, in our terminology) within a larger layout and can then create a manipulable frame referencing that region of interest (a Destination or Referring Region, in our terminology). The manipulable frame has no correlate within Excel; the Excel user cannot, for example, create a single page composed of multiple referring regions for optimized printing, or resize the region, or view the contents of the region on another page in the Excel document.

Object Linking and Embedding, a technology from Microsoft supported by various applications, allows a user to embed content from one application in another. For example, a Microsoft Word™ document may link to a Microsoft Excel™ spreadsheet; the user can select a set of cells in Excel, 'paste special' in Word, and choose the 'paste link' option. The spreadsheet appears within the Word document; changes in the Excel spreadsheet will appear within the Word document; and the spreadsheet in Word may be resized and repositioned within the Word document. The Excel user has no control over how the Excel content will be displayed in Word; the user does not see a manipulable control in Excel, enabling him to, for example, update the location, size, or rotation of the region of the spreadsheet that is displayed; and the user cannot have material visible in Excel but not in Word.

Finally, Computer software and hardware systems commonly display information in "raster image" form: matrices of color information, or pixels, providing a discrete representation of continuous or discrete data including by way of example text glyphs, painted or photographed images, and three-dimensional data. This technology is well-known to those practiced in the art and is referenced in this application.

SUMMARY OF THE INVENTION

In contrast, the present invention provides a manipulable frame to define the source region; the user may select, reposition, resize, and rotate the said source and destination regions at will. This makes it considerably simpler to precisely size and frame content for output in the page containing the destination regions.

Moreover, the present invention allows the user to tag objects appearing within the source region as "non-renderable". Objects tagged in this way do not appear in the destination region, allowing the content publisher to include instructions and other not-for-output graphical content in a layout. This encourages the content publisher to think of their layout as a working area, which can include step-by-step instructions, graphical guides, and other aids to the end user—in the knowledge that they will not be rendered as output.

Additionally, the present invention allows the user to tag objects appearing within the source region with "do not draw shadows". The utility of this feature can be seen as follows: a publisher may present two layouts, one a working area with a dimensional, realistic appearance (e.g. objects casting shadows) and the second a version intended for printing, which isolates only some of the objects in the layout and groups them for efficient printing. The shadows in the first version, which add realism and communicate that objects can be selected and moved about by the user of the working space, would be extraneous in the final print and are removed.

The Microsoft OLE technology does not provide manipulable source regions, does not support scaling or rotation of the source region, and does not provide a generic mechanism for differing presentations of data ("do not render", "do not render shadow") between the source and destination regions.

BRIEF DESCRIPTION OF THE DRAWINGS

A specific embodiment of the invention will now be described, by way of example, with reference to the accompanying drawings in which:

FIG. 1 is a structural rendition of a computer system suitable for implementing the present invention;

FIG. 2 depicts two layouts that include content which is not intended to be present in final output;

FIG. 3 depicts the addition of Source Referring Regions to the regions in FIG. 2;

FIG. 4 depicts layouts containing referred and referring regions both prior to and subsequent to manipulation of regions by the user;

FIG. 5 depicts a layout containing a source referring region and the paired destination referring region;

FIG. 6 depicts a layout containing multiple copies and transformations of Referring Regions;

FIG. 7 depicts the use of do-not-render and do-not-render-shadow flags; and

FIG. 8 depicts manipulation of regions over time.

DESCRIPTION OF A PREFERRED EMBODIMENT OF THE INVENTION

In the following discussion, the present invention is described for illustrative purposes with reference to the editing of raster image information. However, one of ordinary skill in the art will recognize that the invention, in its broadest aspect, is applicable to applications other than image applications, and it is not intended that the scope of the invention be so limited. For example, the present invention is also applicable to the editing of vector data, video data, and to two-dimensional data in general.

Computer Imaging System

A computer graphics imaging system 1 is schematically depicted in FIG. 1. The graphics imaging system 1 includes a computer 2 that has a central processing unit (CPU) 3 which may include local memory 3a, static memory 4 such as Read-only memory (ROM), main memory 5 such as Random Access memory (RAM), mass memory 6 such as a computer disk drive, a system bus 7, adaptor(s) for external input devices 8, and a display adapter 9 which may include local memory 9a. The computer 2 may communicate with an alphanumeric input device 10 such as a keyboard, and/or a pointer device 11 such as a mouse for manipulating a cursor and making selections of data via said input adapter 8. The computer 2 communicates with a video display 12 such as a computer monitor via said display adapter 9.

The computer 2 executes imaging software described below to allow the system 1 to render high quality graphics images on the monitor 12. The CPU 3 comprises a suitable processing device such as a microprocessor, for example, and may comprise a plurality of suitable processing devices. The graphics adaptor 9 may also be capable of executing instructions. Instructions are stored in one or more of the CPU local memory 3a, static memory 4, main memory 5, mass memory 6, and/or display adapter local memory 9a and are executed by the CPU 3 or the display adapter 9.

The static memory 4 may comprise read only memory (ROM) or any other suitable memory device. The local memory may store, for example, a boot program for execution by CPU 3 to initialize the graphics imaging system 1. The main memory 5 may comprise random access memory (RAM) or any other suitable memory device. The mass memory 6 may include a hard disk device, a floppy disk, an optical disk, a flash memory device, a CDROM, a file server device or any other suitable memory device. For the purposes of the present description, the term memory comprises a single memory device and any combination of suitable devices for the storage of data and instructions.

The system bus 7 provides for the transfer of digital information between the hardware devices of the graphics imaging system 1. The CPU 3 also receives data over the system bus 7 that is input by a user through alphanumeric input device 10 and/or the pointer device 11 via an input adaptor 8. The alphanumeric input device 10 may comprise a keyboard, for example, that comprises alphanumeric keys. The alphanumeric input device 10 may comprise other suitable keys such as function keys for example. The pointer device 11 may comprise a mouse, track-ball, tablet and/or joystick, for example, for controlling the movement of a cursor displayed on the computer display 12.

The graphics imaging system 1 of FIG. 1 also includes display adapter hardware 9 that may be implemented as a circuit that interfaces with system bus 7 for facilitating rendering of images on the computer display 12. The display adapter hardware 9 may, for example, be implemented with a special graphics processor printed circuit board including dedicated random access memory 9a that helps speed the rendering of high resolution, color images on a viewing screen of the display 12.

The display 12 may comprise a cathode ray tube (CRT) or a liquid crystal display particularly suited for displaying graphics on its viewing screen. The invention can be implemented using high-speed graphics workstations as well as personal computers having one or more high-speed processors.

The graphics imaging system 1 utilizes specialized graphics software implementing the method described in the present invention. The software implements a user interface and related processing algorithms as described in subsequent sections to enable the user to produce graphical works viewed on the display 12 and which may be stored in mass memory 6, for example the assembly of graphical objects such as bitmaps. Source material for use with such a system can include previously digitized materials stored on a computer memory 6 such as images acquired from digital cameras, scanning devices, or the internet, which may be stored on a large capacity hard or fixed disk storage device.

Graphics Imaging System

A "Graphical Object" in this invention refers to a bitmaps, vector artwork, an editable text object, a video clip, or other item that may be displayed on a computer screen. A "Layout" in this invention refers to an arrangement of graphical objects within a bounding region, such as the graphic produced to create a printed page, poster, or emailed images. A "Graphics Imaging System" in this invention refers to an editing environment which presents Layouts to a user for editing or viewing. Within the Graphics Imaging System, a single "Project" may include multiple layouts; for example a printed wedding album composed of 40 "slides" may be composed of 40 Layouts in digital format, which are printed and bound into a single physical album—enabling the user to load, edit and save that Project as a unit for convenience.

FIG. 2 includes a Graphics Imaging System 1. This abstract representation is intended to convey the containment of a set of Layouts 20 and 21, which are presented to the user for edition either one at a time or in a view presenting multiple layouts simultaneously.

Each Layout contains graphics 25 and 26 which can be manipulated individually by a user, as well as optional content which is not intended to be present in final output from the layouts. By way of example, instructions to the user 27, 28 are illustrated in FIG. 1—these instructions are not intended to be printed; they are merely visible during editing of the layout and not presentation of the finished results. This optional content may take the form of graphical overlays, instructions, graphical objects which may optionally be integrated by the user in the final layout, and other materials which are not intended to be viewed by the ultimate recipient of the layout.

Source and Destination Regions

A Source Referred Region is a user-defined extent within a Layout that indicates a region of that layout which will be referenced and redrawn in a matching Destination Referring Region. The redrawing in the destination may not be an exact reproduction of the source; objects that appear in the source may be tagged by a user in such a way that they are drawn differently in the destination, or indeed are not drawn at all.

A concrete example of the use of these regions is the construction of a digital graphical layout which assists the user to create a greeting card—a physical art project—which will be printed out on typical desktop printer (which prints to 8.5×11 sheets of paper, or any other format). The card is folded in half, such that the two sides of a printed sheet become the front and back of the card, respectively. The 'back' of the card therefore needs to be printed upside down. A user may prefer to see this upside-down graphic presented right-side-up; this implies a distinction between an editing layout and a final presentation layout.

FIG. 3 depicts the Graphics Imaging System from FIG. 2, with the addition of Source Referring Regions 30 and 31. The frames indicating the source regions 30 and 31 are drawn atop the Layouts 20 and 21 respectively.

FIG. 4 depicts a project composed of three layouts at two points in time. In the top of the figure, Layouts 20a, 21a and 22a are seen to contain different types of regions. Two source referred regions 30a and 31a appear and are referred to by two matching destination referring regions 32a and 33a, which are both arranged within layout 22a. Note that 32a has been rotated to fit the page; the orientation and size of the source and destination regions are arbitrary. At the bottom of the figure, Layouts 20b, 21b and 22b represent the updated pages of the layout after modification of the regions by a user: the addition, deletion and rearranging of a graphical element to layout 20a (now 20b), and the resizing of Source Referred Region 31a (now 31b). The results of these modifications are visible in 22b, where the destination referring regions 32b and 33b reflect the changes to the underlying layouts 20b and the size of the referred source region 31b respectively.

FIG. 5 depicts a graphics imaging system 1 in which both a source referring region 61 and the paired destination referring region 62 appear within a single layout 60. Changes to the content under region 61 are visible in region 62 (either immediately or on a delay timer)

FIG. 6 depicts multiple copies and transformations of Referring Regions. A graphics imaging system in which two layouts 70 and 72 contain graphical elements is presented. In layout 70, a Source Referred Region 71 has been placed over a set of three graphical elements. In layout 72, three separate Destination Referring Regions 73, 74 and 75 have been placed which each refer to 71. Note that 75 has been rotated and scaled; changes to the content in layout 70 will be reflected in all three Referring regions 73, 74 and 75.

FIG. 7 depicts the use of do-not-render and do-not-render-shadow flags. A single layout 80 in a graphics imaging system 1 contains a Source Referred Region 81 that has been positioned over a set of five graphical objects and a matching Destination Referring Region 82. A particular graphical object 85 is contained within the source referred region 81; it is therefore drawn in the destination referring region 82. However, this graphical item 85 has had the 'do not draw shadow' flag set and thus the representation 87 of that object 85 is displayed within the destination referring region 82 without a shadow. Elsewhere, a particular graphical object 86 (instructional text intended for the user but not to be included in final output) appears within region 81 but is not drawn (indicated at 88) in the destination referring region 82 because object 86 has had a flag "do not draw" set.

FIG. 8 depicts manipulation of regions over time. A Graphics Imaging System 1 contains two layouts which begin in state 90a and 91a. Layout 90a includes a Source Referred Region 92a which bounds a section of the layout 90a; Layout 91a includes a Destination Referring Region 93a which draws the contents of 92a. As time passes, the user drags the source region 92a to a new position, illustrated in layout 90b (updated from 90a), in which the source region (now 92b) covers a different section of the layout. The results, displayed in the referring frame 93b in layout 91b, reflect the updated position of the source region 92b over layout 90b. As further time passes, the user rotates the source region 92b (now 92c), resulting in the apparent rotation of the content displayed within the matching destination referring region 93c on layout 91c.

Accordingly, the present invention proposes a method for arranging a set of references to graphical layouts into other graphical layouts, the method comprising the steps of:

a. defining a source referred region SR within a source graphical layout SL;
b. defining a destination referring region DR within a destination graphical layout DL;
c. maintaining a connection between said source referred region SR and said destination referring region DR such that changes to graphical content within said source referred region SR are apparent within said destination referring region DR;
d. specifying the drawing behavior of graphical objects within SL under referenced rendering, said behavior including the option "do not draw";
e. enabling selection and direct manipulation of said Source Referred Region SR by a pointing device, said manipulation including repositioning SR by dragging the region and resizing SR by dragging a corner of the region; and
f. when called upon to do so, processing said source referred region SR of source graphical layout SL to a quality suitable for output as part of the destination graphical layout DL.

The method according to the invention may also be implemented such that the source graphical layout SL and the destination graphical layout DL are the same graphical layout. Furthermore, the destination graphical layout DL can include a plurality of destination referring regions DR1 . . . DRn referencing source referred regions SR1 . . . SRn from multiple source graphical layouts SL1 . . . SLn. Additionally, multiple instances of said destination referring regions DR1 . . . DRn reference said source reference region SR, resulting in the appearance of multiple copies. In one embodiment, the destination referring region DR is fixed to have the same size as the said source referred region SR. Alternatively, the destination referring region DR is allowed to vary in size with respect to the source referred region SR, resulting in an apparent scaling of the region SR in destination graphical layout DL.

The drawing behaviors may further include "do not draw shadows" under which behavior shadows are rendered in SR but not rendered in DR.

For easy manipulation of the method, the drawing behaviors can be effected using a contextual menu on the graphical object.

The present invention is also concerned with a system implementing the above process.

Having described the invention, it should be apparent to those of ordinary skill in the art that the foregoing is illustrative and not limiting. Numerous modifications, variations and alterations may be made to the described embodiments without departing from the scope of the invention by one of ordinary skill in the art and are contemplated as falling within the scope of the invention as defined by the appended claims.

The invention claimed is:

1. A method for arranging a graphical layout, the method comprising the steps of:

defining in memory a source referred region within a source graphical layout, wherein the source graphical layout is an arrangement of graphical objects within a bounding region and wherein the source referred region is an extent within the source graphical layout and is capable of including more than one of the graphical objects arranged in the source graphical layout;

defining in memory a destination referring region within a destination graphical layout, wherein the destination graphical layout is an arrangement of graphical objects within a bounding region and wherein the destination referred region is an extent within the destination graphical layout and is capable of including more than one of the graphical objects arranged in the destination graphical layout;

processing, with a processor, the source referred region such that graphical content in the source referred region is rendered in the destination referring region;

receiving input from a user indicative of modifications to be made to graphical content within the destination graphical layout, such modifications including at least selection and placement of graphical objects in the source graphical layout, positioning and sizing in at least two dimensions of the source referred region within the source graphical layout and positioning and sizing in at least two dimensions of the destination referred region in the destination graphical layout;

in response to the received input, processing the modifications such that the selected graphical objects in the source referred region is rendered in the destination referring region in the destination graphical layout; and performing said receiving input and processing the modifications such that the modifications to be made to graphical objects in the source graphical layout that lie within the extent defined by the source referred region are rendered interactively in the destination graphical layout within the extent defined by the destination referring region while the user is inputting such modifications.

2. A method according to claim 1, wherein the drawing behavior of graphical objects within the source graphical layout includes a do not draw command.

3. A method according to claim 1, wherein the source graphical layout and the destination graphical layout are the same graphical layout.

4. A method according to claim 1, wherein the destination graphical layout includes a plurality of destination referring regions referencing source referred regions from multiple source graphical layouts.

5. A method according to claim 1, wherein multiple instances of the destination referring regions reference the source referred region, resulting in the appearance of multiple copies of content of the source referred region in the destination layout.

6. A method according to claim 1, wherein the destination referring region is fixed to have the same size as the source referred region.

7. A memory having computer instructions stored thereon for implementing a method for arranging a graphical layout, the method comprising the steps of:

defining in memory a source referred region within a source graphical layout, wherein the source graphical layout is an arrangement of graphical objects within a bounding region and wherein the source referred region is an extent within the source graphical layout and is capable of including more than one of the graphical objects arranged in the source graphical layout;

defining in memory a destination referring region within a destination graphical layout, wherein the destination graphical layout is an arrangement of graphical objects within a bounding region and wherein the destination referred region is an extent within the destination graphical layout and is capable of including more than one of the graphical objects arranged in the destination graphical layout;

processing, with a processor, the source referred region such that graphical content in the source referred region is rendered in the destination referring region;

enabling a user to input modifications to be made to graphical content within the destination graphical layout, such modifications including at least selection and placement of graphical objects in the source graphical layout, positioning and sizing in at least two dimensions of the source referred region within the source graphical layout and positioning and sizing in at least two dimensions of the destination referred region in the destination graphical layout;

in response to the received input, processing the modifications such that the selected graphical objects in the source referred region is rendered in the destination referring region in the destination graphical layout; and performing said receiving input and processing the modifications such that the modifications to be made to graphical objects in the source graphical layout that lie within the extent defined by the source referred region are rendered interactively in the destination graphical layout within the extent defined by the destination referring region while the user is inputting such modifications.

8. A memory according to claim 7, wherein the drawing behavior of graphical objects within the source graphical layout includes a do not draw command.

9. A memory according to claim 7, wherein the source graphical layout and the destination graphical layout are the same graphical layout.

10. A memory according to claim 7, wherein the destination graphical layout includes a plurality of destination referring regions referencing source referred regions from multiple source graphical layouts.

11. A memory according to claim 7, wherein multiple instances of the destination referring regions reference the source referred region, resulting in the appearance of multiple copies of content of the source referred region in the destination layout.

12. A memory according to claim 7, wherein the destination referring region is fixed to have the same size as the source referred region.

13. A memory according to claim 7, wherein the destination referring region is allowed to vary in size with respect to the source referred region.

14. The method of claim 1, further comprising:
specifying a drawing behavior of graphical objects within the source graphical layout;
processing the source referred region of the source graphical layout to output the destination graphical layout such that the drawing behavior of graphical objects within the source graphical layout is reflected only in the source referred region.

15. The memory of claim 7, wherein the method further comprises:
specifying a drawing behavior of graphical objects within the source graphical layout;
processing the source referred region of the source graphical layout to output the destination graphical layout such that the drawing behavior of graphical objects within the source graphical layout is reflected only in the source referred region.

16. A computer system, comprising:
a processor;
a memory having computer instructions stored therein that, when processed by the processor, instruct the computer system to perform a process for arranging a set of references to graphical layouts into other graphical layouts, the process comprising:

defining in memory a source referred region within a source graphical layout, wherein the source graphical layout is an arrangement of graphical objects within a bounding region and wherein the source referred region is an extent within the source graphical layout and is capable of including more than one of the graphical objects arranged in the source graphical layout;

defining in memory a destination referring region within a destination graphical layout, wherein the destination graphical layout is an arrangement of graphical objects within a bounding region and wherein the destination referred region is an extent within the destination graphical layout and is capable of including more than one of the graphical objects arranged in the destination graphical layout;

processing, with a processor, the source referred region such that graphical content in the source referred region is rendered in the destination referring region;

enabling a user to input modifications to be made to graphical content within the destination graphical layout, such modifications including at least selection and placement of graphical objects in the source graphical layout, positioning and sizing in at least two dimensions of the source referred region within the source graphical layout and positioning and sizing in at least two dimensions of the destination referred region in the destination graphical layout;

in response to the received input, processing the modifications such that the selected graphical objects in the source referred region is rendered in the destination referring region in the destination graphical layout; and performing said receiving input and processing the modifications such that the modifications to be made to graphical objects in the source graphical layout that lie within the extent defined by the source referred region are rendered interactively in the destination graphical layout within the extent defined by the destination referring region while the user is inputting such modifications.

17. The computer system of claim 16, wherein the process performed by the computer system further comprises:

specifying a drawing behavior of graphical objects within the source graphical layout;

processing the source referred region of the source graphical layout to output the destination graphical layout such that the drawing behavior of graphical objects within the source graphical layout is reflected only in the source referred region.

18. The computer system of claim 16, wherein the destination graphical layout includes a plurality of destination referring regions referencing source referred regions from multiple source graphical layouts.

19. The computer system of claim 16, wherein multiple instances of the destination referring regions reference the source referred region, resulting in the appearance of multiple copies of content of the source referred region in the destination layout.

* * * * *